(12) United States Patent
Saraya et al.

(10) Patent No.: US 12,461,741 B2
(45) Date of Patent: Nov. 4, 2025

(54) CONTRASTIVE REVIEW OF SOFTWARE APPLICATION MODIFICATIONS

(71) Applicant: INTERNATIONAL BUSINESS MACHINES CORPORATION, Armonk, NY (US)

(72) Inventors: Siddharth K. Saraya, Raniganj (IN); Mukundan Sundararajan, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 187 days.

(21) Appl. No.: 18/356,158

(22) Filed: Jul. 20, 2023

(65) Prior Publication Data
US 2025/0028527 A1    Jan. 23, 2025

(51) Int. Cl.
*G06F 8/73* (2018.01)
*G06F 8/71* (2018.01)
*G06F 8/77* (2018.01)
*G06F 11/14* (2006.01)

(52) U.S. Cl.
CPC ............... *G06F 8/73* (2013.01); *G06F 8/71* (2013.01); *G06F 8/77* (2013.01); *G06F 11/1402* (2013.01)

(58) Field of Classification Search
None
See application file for complete search history.

(56) References Cited

U.S. PATENT DOCUMENTS

| | | | |
|---|---|---|---|
| 9,569,179 B1* | 2/2017 | Kachmar | G06F 8/30 |
| 10,732,962 B1* | 8/2020 | Florescu | G06F 11/0706 |
| 11,836,485 B1* | 12/2023 | Cancilla | G06F 8/75 |
| 2013/0086562 A1* | 4/2013 | Pistoia | G06F 8/43 717/132 |
| 2014/0195662 A1* | 7/2014 | Pulipakkam | G06F 8/65 709/223 |
| 2019/0250893 A1 | 8/2019 | Pandit et al. | |

(Continued)

OTHER PUBLICATIONS

D. Alshoaibi, I. Chaabane, K. Hannigan, A. Ouni and M. W. Mkaouer, "On the Detection of Performance Regression Introducing Code Changes: Experience from the Git Project," 2022 IEEE 29th Annual Software Technology Conference (STC), Gaithersburg, MD, USA, 2022, pp. 206-217. (Year: 2022).*

(Continued)

*Primary Examiner* — Andrew M. Lyons
(74) *Attorney, Agent, or Firm* — CHIP LAW GROUP

(57) ABSTRACT

A contrastive review of a computer software application modification includes retrieving an amelioration score for a computer software application, the amelioration score based on a predetermined set of operational attributes associated with functionalities of the computer software application. The functionalities that are affected by the modification of the computer software application are identified and changes to operational attributes associated with the functionalities affected by the modification are determined. A revised amelioration score is generated by recomputing the amelioration score based on the changes to operational attributes of the functionalities affected. The impact of the modification is determined based on a comparison of the amelioration score and the revised amelioration score. A modification report based on the impact is generated.

19 Claims, 4 Drawing Sheets

(56) References Cited

U.S. PATENT DOCUMENTS

| | | |
|---|---|---|
| 2020/0110600 A1 | 4/2020 | Weldemariam et al. |
| 2022/0283784 A1* | 9/2022 | Degen ........................ G06F 8/20 |
| 2023/0073623 A1 | 3/2023 | Li et al. |
| 2023/0105062 A1 | 4/2023 | Perumalla et al. |
| 2023/0273783 A1* | 8/2023 | Molander ................. G06F 8/61 |
| | | 717/168 |
| 2023/0342284 A1* | 10/2023 | Easton ................ G06F 11/3612 |
| 2024/0256242 A1* | 8/2024 | Goyer ................. G06F 11/3604 |

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

Budiu, R., "Improvement Score Due to a Redesign," [online] NN/g Nielsen Norman Group, Copyright @ 1998-2023 Nielsen Norman Group, May 23, 2023, retrieved from the Internet: <https://www.nngroup.com/articles/improvement-score/>, 2 pg.

Nielsen, J., "User Satisfaction vs. Performance Metrics," [online] NN/g Nielsen Norman Group, Copyright @ 1998-2023 Nielsen Norman Group, Oct. 7, 2012, retrieved from the Internet: <https://www.nngroup.com/articles/satisfaction-vs-performance-metrics/>, 4 pg.

* cited by examiner

CONTRASTIVE REVIEW OF SOFTWARE APPLICATION MODIFICATIONS

BACKGROUND

This disclosure relates to computer software applications, and more particularly, to automated assessment of computer software application modifications.

Many computer software applications, after initial development, undergo revision at some point during their lifespan. Such revisions are often intended to add new or enhance existing features of an application. Typically, during an application's initial development phase, considerable attention is paid by developers to the functional and non-function requirements (NFRs) of a computer software application. The same considerations are equally important with respect to later modifications of the application.

SUMMARY

In one or more embodiments, a method includes retrieving an amelioration score for a computer software application. The amelioration score is based on a predetermined set of operational attributes associated with functionalities of the computer software application. The method includes identifying which of the functionalities are affected by a modification of the computer software application. The method includes determining changes to operational attributes associated with the functionalities affected by the modification. The method includes generating a revised amelioration score by recomputing the amelioration score based on the changes to the operational attributes of the functionalities affected. The method includes determining an impact of the modification based on a comparison of the amelioration score and the revised amelioration score. The method includes outputting a modification report based on the impact.

The foregoing and other implementations can each optionally include one or more of the following features, alone or in combination. Some example embodiments include all the following features in combination.

In one aspect, the modification is a multifaceted modification. Which functionalities affected by each implementation of a different facet of the modification are determined. A facet-specific amelioration score is generated for each of the functionalities affected by each implementation. The modification report is additionally based on the facet-specific amelioration scores.

In another aspect, the modification is implementable using two or more alternate functionalities. Accordingly, the method includes generating a functionality-specific amelioration score for each of the two or more alternate functionalities. An indication of which of the two or more alternate functionalities is associated with a highest functionality-specific amelioration score is included in the modification report.

In another aspect, the method includes generating an alert in response to a difference between the amelioration score and the revised amelioration score greater than a predetermined threshold.

In another aspect, in which a succession of modifications to the computer software application is introduced, a succession of revised amelioration scores for each of the succession of modifications are generated. A cumulative amelioration score based on accumulating amelioration scores is generated for each of the succession of modifications for which a succeeding amelioration score differed from a preceding amelioration score by more than a threshold amount. The report generated can indicate that the computer software application should be replaced in response to the cumulative amelioration score falling below a predetermined threshold.

In another aspect, user feedback from multiple users of the computer software application is received, and based on the feedback, an updated amelioration score is generated. In response to determining a difference between the revised amelioration score and updated amelioration score exceeds a predetermined threshold, the modification is rolled back.

In one or more embodiments, a system includes one or more processors configured to initiate executable operations as described within this disclosure.

In one or more embodiments, a computer program product includes one or more computer-readable storage media and program instructions collectively stored on the one or more computer-readable storage media. The program instructions are executable by a processor to cause the processor to initiate operations as described within this disclosure.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
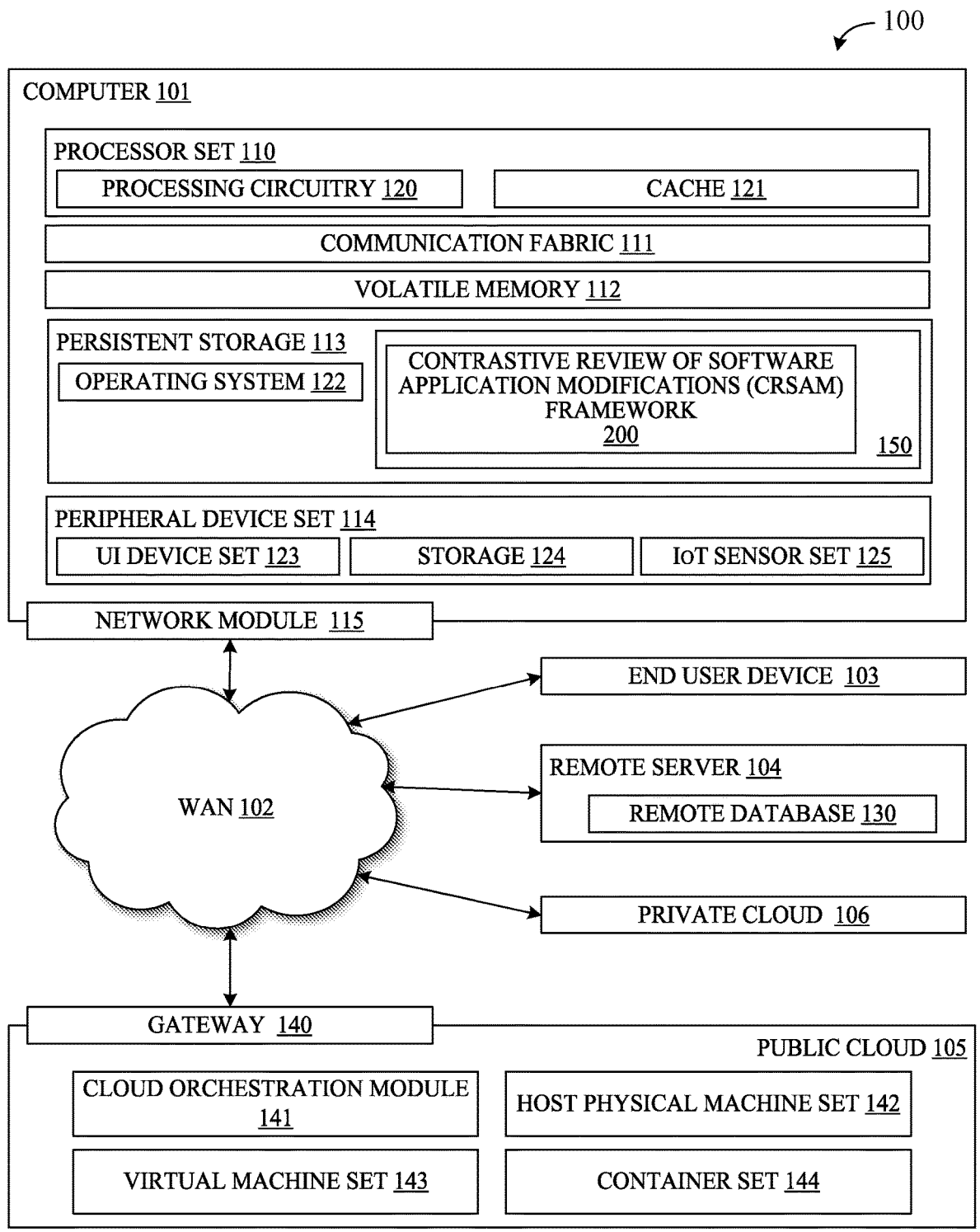
FIG. 1 illustrates an example of a computing environment that is capable of implementing a contrastive review of software application enhancements (CRSAM) framework.

While the disclosure concludes with claims defining novel features, it is believed that the various features described within this disclosure will be better understood from consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to computer software applications, and more particularly, to automated assessment of computer software application modifications.

Developing a computer software application is typically a complex process involving determining requirements, designing an architecture, drafting processor-executable code, and testing the application. Over the life span of a computer software application, there may arise occasions to modify the application. A modification can include a so-called software patch that resolves a functionality problem, a security issue, or adds a new feature. While a patch tends to be a quick-fix, other longer-range modifications of a computer software application also may add one or more new features or may modify or eliminate one or more existing features. In modifying a computer software application, a developer may not have a clear sense of how the modification will impact the performance of the computer software application as executed by the underlying hardware. A modification may affect latency, data throughput, execution time for a transaction, increased power consumption, and/or other measurable operational parameters of the functionalities of the computer software application and, as such, the operation of the computer itself in executing the computer software application. Increased execution time, greater power consumption, or similar such effect is likely to adversely affect a user's experience with the computer software application. Accordingly, there is a high correlation between operational parameters of the functionalities of a computer software application and user experience. The operational parameters correspond to the technical functionality of the computer software application. If a modification of the computer software application slows execution time, increases power consumption, or otherwise adversely affects the technical functionality, the modification is likely to degrade user experience. Developers, however, lack a rigorous, quantifiable guide, let alone an automated mechanism, for determining the probable effect the modification of a computer software application will have on users.

In accordance with the inventive arrangements disclosed herein, methods, systems, and computer program products are provided that are capable of automated determination of the likely effect that a computer software application modification will have on users. Automated determination is based on machine-measurable physical parameters. The parameters, for example, may include the processing time required to complete a procedure. For example, the parameters may include the execution steps or transactions required to complete the procedure. The parameters, for example, may include the amount of user interaction (e.g., the number of point-and-click actions) to complete the procedure. Such machine-measurable physical parameters are correlated with user experience and are used by the inventive arrangements to predict the effect that each modification of a computer software application is likely to have on user experience with the application.

An aspect of the inventive arrangements is the automated determination of an amelioration score based on machine-measurable physical parameters. The amelioration score may reflect the fact that a modification that increases the time needed to complete a transaction likely degrades user experience, given that users typically do not welcome waiting longer. A modification that increases the number of transactions necessary to complete a user action likewise probably adversely affects the amelioration score, given that the modification increases the quantity of machine resources of the user's device (e.g., computer, smartphone, smartwatch) that must be reallocated from other applications. The amelioration score is likely diminished if the modification increases the number of user-machine interactions, given that users value convenience and efficiency. The amelioration score provides a quantifiable measure of the effects. Quantifying the effects permits the comparison of different effects resulting from different modifications of a computer software application.

Another aspect of the inventive arrangements is enabling use of feature-specific amelioration scores. With each feature added, eliminated, or altered by successive modifications of a computer software application, the amelioration score may be revised. If during a succession of modifications, the overall amelioration score falls below a predetermined threshold, a notification may be automatically generated alerting a developer. The notification may recommend a different approach to the planned modification. The notification may recommend, given the specific value of the amelioration score, creating a new application rather than updating the existing one. This allows the developer to avoid excessively modifying the existing computer software application and prompts consideration of a different modification or a complete abandonment of the application in favor of creating a wholly new application.

Yet another aspect of the inventive arrangements is directing development based on a comparison of amelioration scores when two or more alternative features are considered for modifying the computer software application. As different features are proposed and corresponding amelioration scores generated with respect to each, a notification can be generated identifying the feature that performs best based on assessment of the amelioration scores.

Still another aspect of the inventive arrangements is generating an amelioration score based, at least in part on user feedback, after a modified version of the computer software application is released. If, based on the user feedback, the amelioration score is below a predetermined threshold, the computer software application can be rolled back to the pre-modification version and re-released.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code in block 150 involved in performing the inventive methods, such as CRSAM framework 200 implemented as executable program code or instructions.

Computing environment 100 additionally includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and CRSAM framework 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (e.g., a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (e.g., private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
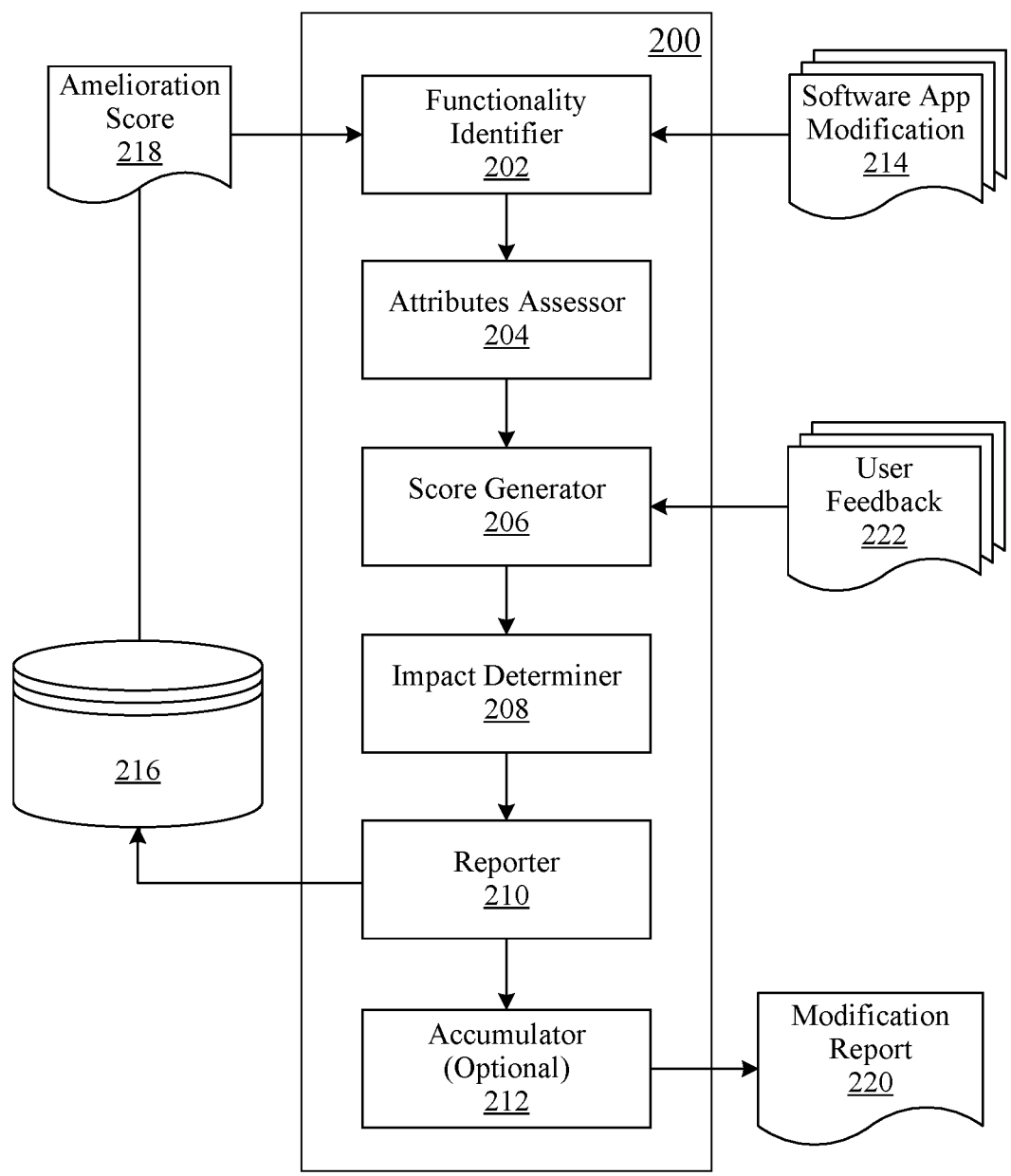
FIG. 2 illustrates an example architecture of the executable CRSAM framework of FIG. 1.

FIG. 2 illustrates an example architecture for the executable CRSAM framework 200 of FIG. 1. In the example of FIG. 2, CRSAM framework 200 illustratively includes functionality identifier 202, attributes assessor 204, score generator 206, impact determiner 208, and reporter 210. CRSAM framework 200 optionally also includes accumulator 212.

Figure 3:
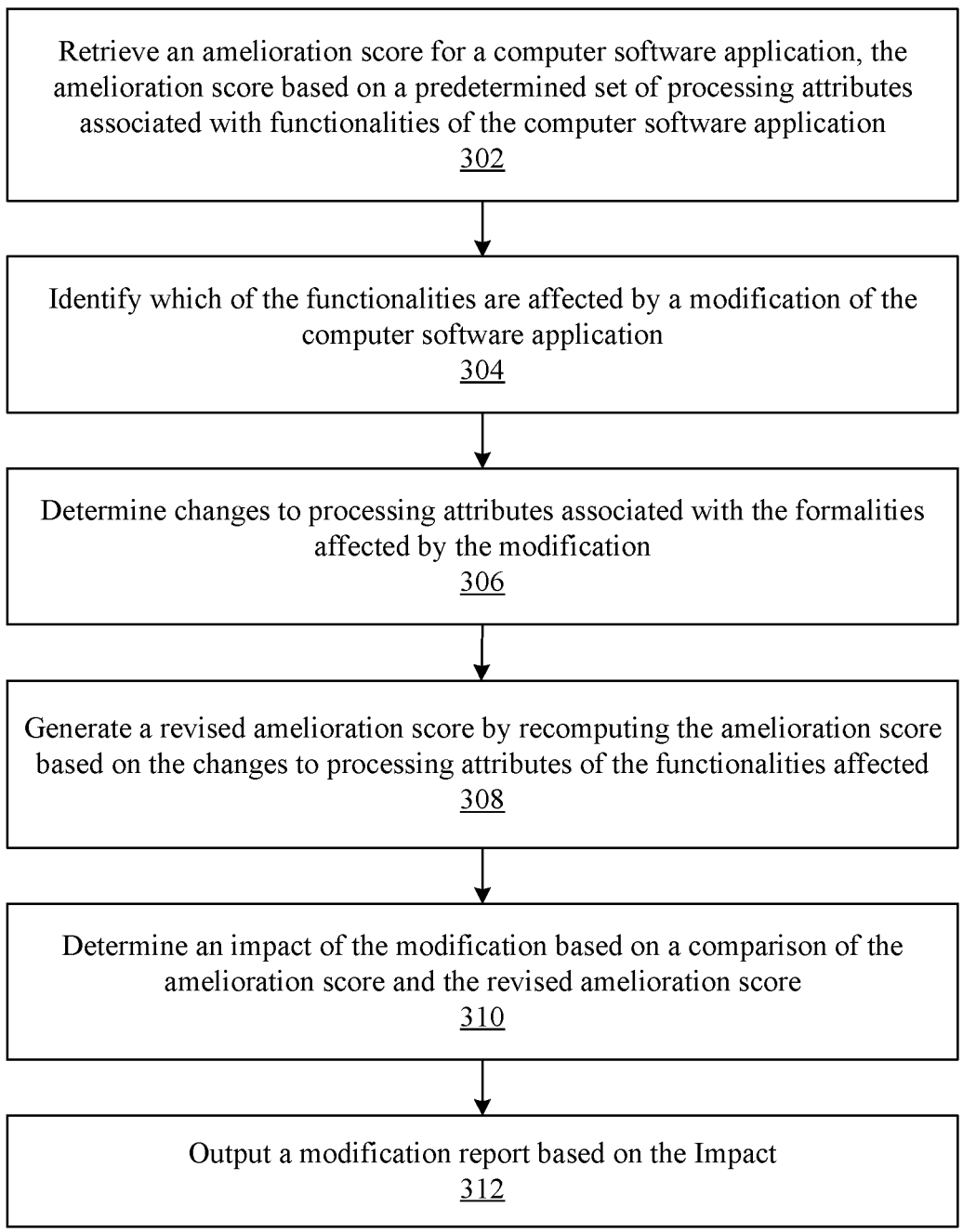
FIG. 3 illustrates an example method of operation of the CRSAM framework illustrated in FIGS. 1 and 2.

FIG. 3 illustrates an example method 300 of operation of the CRSAM framework 200 of FIGS. 1 and 2. Method 300 is invoked in response to input to CRSAM framework 200, the input comprising a software application modification 214 designed to change one or more functionalities of a computer software application.

Referring to FIGS. 2 and 3 collectively, in block 302, CRSAM framework 200 retrieves from database 216 amelioration score 218 for the computer software application. Amelioration score 218 is based on a predetermined set of operational attributes associated with functionalities of the computer software application. Each functionality is implemented by a processor-executed operation or set of operations corresponding to a processing action performed by the computer software application. The operational attributes associated with each functionality illustratively include the time for processing operations performed by the functionality, the number of clicks or other user interactions to complete the operations, and user feedback regarding the functionality. Additional or fewer or different operational attributes, in other embodiments, can be associated with the functionalities of the computer software application.

The operational attributes are correlated with ease of use and/or overall user experience with the computer software application. In certain embodiments, the values of the associated operational attributes are determined by time to complete the transactions or operations of a functionality, a count of the number interactions, and the net number of positive versus negative user comments. The average time, average number of interactions, and average net number of comments over n functionalities are, respectively, parameters for three corresponding functions, whose values are summed to generate amelioration score 218 for the computer software application, X:

$$F(X) = f\left(\sum_{i=1}^{n} T_i(X)/n\right) + g\left(\sum_{i=1}^{n} C_i(X)/n\right) + h\left(\sum_{i=1}^{n} S_i(X)/n\right), \quad \text{EQ. 1}$$

where $f(\cdot)$, $g(\cdot)$, and $h(\cdot)$, respectively are functions of average time, average number of interactions (e.g., clicks), and average of net positive and negative comments, where $T_i(X)$ is time with respect to the i-th functionality, where $C_i(X)$ is the number of interactions with respect to the i-th functionality, and where $S_i(X)$ is the net number of comments with respect to the i-th functionality. A functionality-specific amelioration score, $$F_i = f_i(T_i(X)) + g_i(C_i(X)) + h_i(S_i(X)), \quad \text{EQ. 2}$$

may be computed for each of the individual functionalities, where i=1, ..., n.

In block 304, functionality identifier 202 identifies the specific functionalities that are affected by a modification of the computer software application. In certain embodiments, functionality identifier 202 simulates execution of the computer software application modified according to software application modification 214. In other embodiments, functionality identifier 202 performs a static analysis of the code of the computer software application modified according to software application modification 214. By running through the control flow of the computer software application, a static analysis can determine which code modules are traversed and can estimate the number of cycles for the respective instructions because of the modification. The number of modules affected, and the number of changes made can be traced from attribute definitions and/or processing directives (e.g., business rules), as well as from the functional flow. The static analysis can map changes to the code and the impact in terms of various operational parameters, such as the extra number of cycles, additional delays (e.g., added wait time for a new micro-service response or to populate newly added fields), and/or other effects owing to the modification to the computer software application.

Software application modification 214 affects the i-th functionality of the computer software application if $T_i(X)$ changes and/or if $C_i(X)$ changes. $T_i(X)$ changes according to whether the i-th functionality takes longer or less time to complete. $C_i(X)$ according to whether i-th functionality requires a greater or lesser number of user interactions to complete. Unless and until the computer software application is, in fact, modified according to software application modification 214 and released, the $S_i(X)$ corresponding to each of the functionalities remains unchanged. The i-th functionality may correspond to one or more modules impacted by software application modification 214 as determined, for example, by the simulation or static analysis described above. The effect of software application modification 214 on an affected module thus can be measured by the change in $T_i(X)$ and/or $C_i(X)$.

In block 306, attributes assessor 204 quantifies the changes to operational attributes associated with the functionalities affected by software application modification 214. For each functionality affected by software application modification 214, assessor 204 computes a corresponding time of execution, $T_i(X)$, and number of user interactions, $C_i(X)$. Changes to the operational parameters quantify the effects that software application modification 214 has on the affected functionalities.

In block 308, score generator 206 generates a revised amelioration score by recomputing the amelioration score based on the changes to operational attributes of the functionalities affected. The computed $T_i(X)$ and $C_i(X)$, including those whose values changed as a result of one or more functionalities being affected, are again the parameters for revising the amelioration score. The amelioration score is revised as follows, where F'(X) denotes the recomputed amelioration score:

$$F' = f\left((T_1 + \ldots + T'_j + \ldots + T_n)/n\right) + \quad \text{EQ. 3}$$
$$g\left((C_1 + \ldots + C'_j + \ldots + C_n)/n\right) + h\left((S_1 + \ldots + S'_j + \ldots + S_n)/n\right)$$

where $T_j'$ and $C_j'$ correspond to changed values for the j-th functionality, though more than one functionality is likely affected by software application modification 214. Note that $S_j$ does not change unless software application modification 214 is made and the computer software application is released as modified.

In block 310, impact determiner 208 determines the impact of software application modification 214 based on a comparison of amelioration score 218 and the revised amelioration score. The impact may quantitatively measure the change in amelioration score 218 resulting from software application modification 214's effect on one or more functionalities. For example, in certain embodiments, the functions $f(\bullet)$ and $g(\bullet)$ may be chosen such $\partial f/\partial T_i < 0$ and $\partial g/\partial C_i < 0$ for all n functionalities, where $\partial f/\partial T_i$ and $\partial g/\partial C_i$ are the partial derivatives of the functions $f(\bullet)$ and $g(\bullet)$ with respect to execution time and number of user interactions, respectively. Accordingly, if software application modification 214 increases the execution time and/or number of user interactions necessary for performing one or more of the functionalities, then $F'(X) < F(X)$. The numerical difference between amelioration score 218 and the revised amelioration score owing to software application modification 214 quantifies how much the modification changes the operational parameters of the affected functionalities, and hence, performance of the application overall.

Performance of the computer software application is highly correlated with usability, ease of use, and overall user satisfaction with the computer application software. A modification that increases the time needed to complete a transaction likely degrades user experience, given that users typically do not welcome waiting longer. A modification that increases the number of transactions necessary to complete a user action likewise probably adversely affects the user experience, given that the modification increases the quantity of machine resources of the user's device (e.g., computer, smartphone, smartwatch) that must be reallocated from other applications. Similarly, user experience is likely adversely affected if the modification increases the number of user-machine interactions, given that users value convenience and efficiency. The correlation between operational parameters and amelioration score 218 is reflected in the diminution of the score due to changes in operational parameters such as time of execution $T_i(X)$ and number of user interactions $C_i(X)$ required. Given that $\partial f/\partial T_i < 0$ and $\partial g/\partial C_i < 0$, the change in operational parameters is quantitively measurable by the reduction in amelioration score 218, which in turn is correlated with user satisfaction.

In certain embodiments, impact determiner 208 also computes a revised functionality-specific amelioration score for each functionality affected by software application 214. For the i-th functionality, if affected by software application modification 214, the revised functionality-specific amelioration score is $$F'_i = f_i(T'_i(X)) + g_i(C'_i(X)) + h_i(S_i(X)) \qquad \text{EQ. 4}$$

where the revision is due to the change in time, $T_i'(X)$, and number of user interactions, $C_i'(X)$, necessary to complete the functionality as modified. Impact determiner 208 can quantify the impact of software application modification 214, for example, by computing the difference between $F_i$ and $F_i'$.

In block 312, reporter 210 generates modification report 220 based on the impact. Modification report 220 may include a comparison of the revised modification score with amelioration score 218. The comparison may indicate the quantitative difference between amelioration score 218 and the revised amelioration score. In some embodiments, a greater-than-threshold difference between amelioration score 218 and the revised amelioration score causes CRSAM framework 200 to generate an alert as part of a recommendation indicating to a developer potentially significant effect of software application modification 214 on operability of the software application and/or on users.

In certain embodiments, modification report 220 also indicates which functionalities of the computer software application are affected by software application modification 214. For each functionality affected by software application modification 214, modification report 220 may include a quantitative comparison between the functionality-specific amelioration score and the corresponding revised functionality-specific amelioration score. The comparison can indicate which affected functionality has the greatest impact on changing amelioration score 218.

If software application modification 214 is a multifaceted modification in which different combinations of one or more functionalities may be affected depending on which facet is implemented, then attributes assessor 204 may determine which functionalities are affected by each implementation of a different facet of the modification. In a hypothetical banking application described below, for example, a multi-faceted security feature may include a login functionality that relies on a user id and password, a one-time password functionality, and a biometric functionality, each of which may be used individually or jointly in different combinations. Score generator 206 may determine a facet-specific amelioration score for each functionality affected by each implementation of a different facet. Modification report 220, accordingly, can be generated by reporter 210 based on the facet-specific amelioration score and can report the effect of implementing each facet of the multifaceted modification.

If any portion of software application modification 214 is implementable using two or more alternate functionalities, then score generator 206 may generate a functionality-specific amelioration score for each of the two or more alternate functionalities. Modification report 220 generated by reporter 210 may include an indication of which of the two or more alternate functionalities is associated with a highest functionality-specific amelioration score.

In some arrangements, a succession of modifications to the computer software application, either planned in advance or arising over time, may be contemplated. Whether all are implemented or not, functionality identifier 202 may identify each functionality affected by each successive modification, and attributes assessor may determine the effect on each functionality affected. Score generator 206, accordingly, may generate a succession of revised amelioration scores for each of the succession of modifications regardless of which modifications are in fact implemented. Optionally, CRSAM framework 200 includes accumulator 212. Accumulator 212 generates a cumulative amelioration score by successively adding or otherwise accumulating amelioration scores generated for each successive modification having a corresponding amelioration score that differed from a preceding amelioration score by a predetermined threshold. That is, accumulator 212 generates a cumulative amelioration score associated with each modification, whether implemented or not, that may have degraded computer software application by more than a threshold amount, as indicated by successive amelioration score revisions.

For example, if a diminution of succeeding amelioration score $F'(X)$ relative to the preceding amelioration score $F(X)$ such that $F'(X) < F(X)$ indicates a likely degradation in user satisfaction, then there is a point at which a developer should consider avoiding further modifications and instead consider replacing the computer software application altogether. Accordingly, if at any point during a succession of proposed or actual modifications to the computer software application the cumulative accumulation score determined by accumulator 212 falls below a predetermined threshold, then reporter 210 automatically generates a recommendation that the computer software application be replaced.

Figure 4:
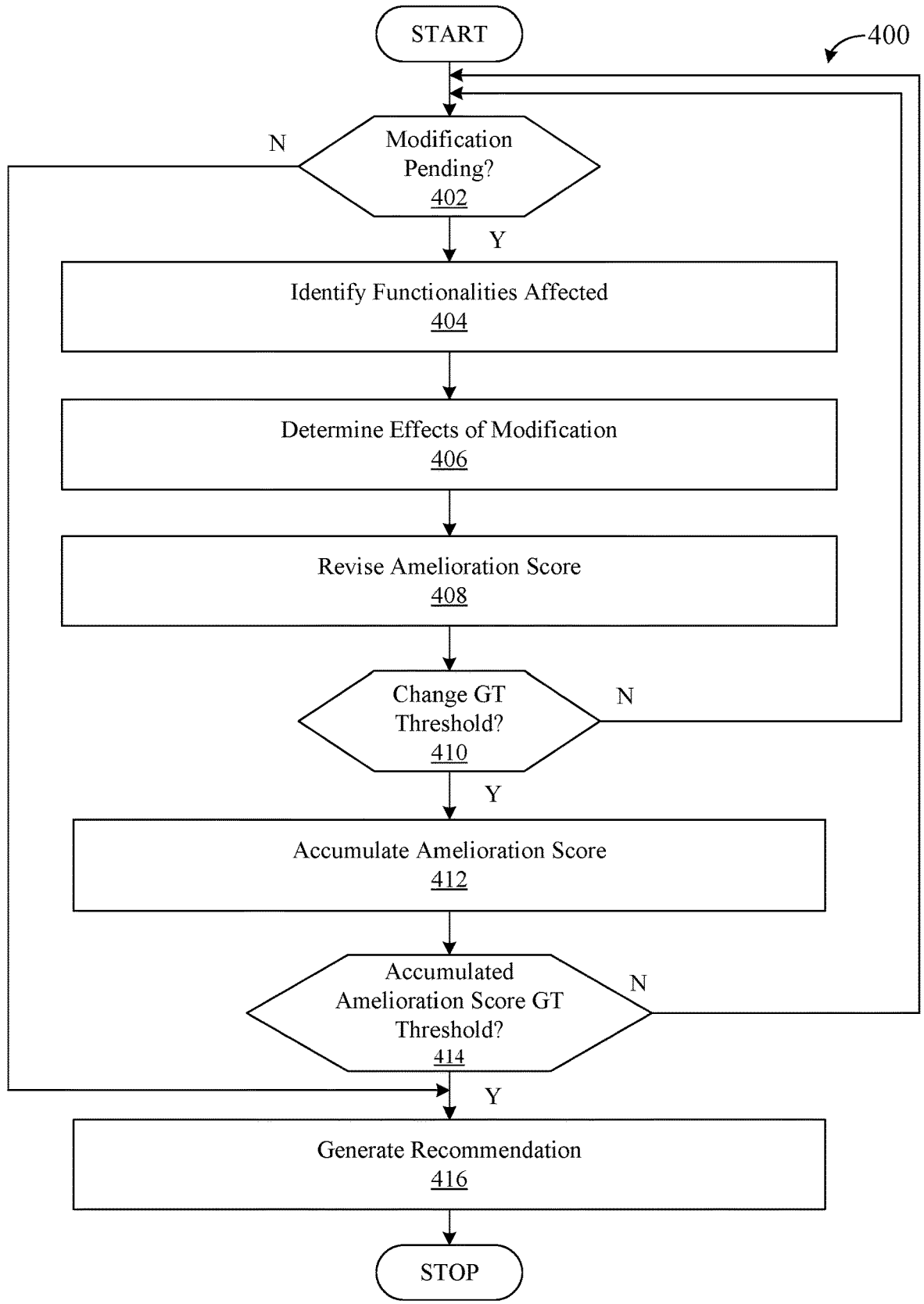
FIG. 4 illustrates certain operative aspects of the CRSAM framework illustrated in FIGS. 1 and 2.

FIG. 4 illustrates method 400, implemented by a system such as CRSAM framework 200, for determining whether successive modifications lead to a point of abandonment of an existing computer software application in favor of developing a wholly new one.

In block 402, the system determines whether a modification to the computer software application is pending in response to user input specifying the modification. If so, then in block 404 the system identifies which functionalities of the computer software application are affected by the modification. The effects of the modification on each functionality affected is determined by the system in block 406. In block 408, the system retrieves an amelioration score and revises the amelioration score based on the effects of the modification. If the system determines in block 410 that the difference between the revised amelioration score and a preceding one is greater than a predetermined threshold, the revised amelioration score is accumulated by the system with others to update accumulated amelioration score in block 412. The system in block 414 determines whether the accumulated amelioration score is greater than a predetermined threshold. If so, then the system generates a recommendation in block 416. The recommendation is that no further modification be made to or proposed for the computer software application. Rather, according to the recommendation, the computer software application should be abandoned in favor of developing a wholly new computer software application.

User sentiment is a factor that, as illustrated in EQ. 1, may be used to determine amelioration score 218. Unless a modification is implemented, however, the user sentiment does not change and is not a factor in revising the amelioration score. Release of the computer software application allows for user feedback to influence revisions to the amelioration score. Referring again to FIG. 2, user feedback 222 is input to score generator 206. User feedback can comprise speech or text. CRSAM framework 200 optionally may include a sentiment analyzer (not shown) to determine the sentiment based on text and/or speech of multiple users in response to the release of the computer software application, as modified. The average net number of positive versus negative sentiments per each functionality can be a parameter of function h(•) for revising amelioration score 218 according to EQ. 3. of the computer software application. Score generator 206 may update or revise amelioration score 218 based on user feedback 222. As described in the context of changes to processing parameters of functionalities affected by software application modification 214, user feedback 222 may cause an update amelioration score 218 that indicates a diminishment of user satisfaction. Accordingly, in response to determining that the difference between the revised amelioration score—a revision of amelioration score 218 based on changes to the processing parameters of affected functionalities—exceeds the updated amelioration score by more than a predetermined threshold, the modifications made to the released version of the computer software application may be rolled back.

Optionally, CRSAM framework 200 may store modifications (e.g., processor-executable code) made to the computer software application in database 216. The modifications can be stored along with the effect that the modifications had on amelioration score 218 of the computer software application. Moreover, those modifications that resulted in, or were projected to cause, a greater-than-threshold change in amelioration score 218 may be stored in database 216. Amelioration changes to the feature for proposed changes are stored in the database. Modifications not implemented are nonetheless stored in database 216 along with corresponding changes to amelioration score 218 and can serve as a guide for potential modifications to other computer software applications. Various regulations, proposed designs, test results also may be stored in database 216 for future use in developing different original and modified computer software applications.

Certain operative aspects of CRSAM framework 200 may be illustrated with respect to a hypothetical banking application designed to permit a user to login using a user id and password. Once logged in, the user is able to engage in various transactions, including transferring funds and viewing account balances. The entity owning the application may contemplate a modification that would add an additional layer of security based on use of a one-time password (OTP) functionality. If the banking application is modified to include the new functionality and released without eliminating the user id and password required for authentication, then as modified the application relies on an additional screen to capture the OTP. When the user supplies the OTP, the OTP is encrypted and transferred to a server for authentication before the user can proceed further with one or more intended actions. The modification thus introduced the extra screen, increased average processing time, and required more user interactions ("clicks") prior to engaging in banking transactions.

An additional modification to the hypothetical banking application intended to further increase security is the introduction of biometric functionality. The modification allows the user to choose whether to use a user id and password or the newly added biometric functionality for authentication to the system, which presents the user with the OTP page. Making the choice as to which functionalities to use adds a user interaction or click by the user.

In the context of the hypothetical banking application, CRSAM framework 200 calculates a current amelioration score vis a vis a revised amelioration score, which is revised in response to the proposed modifications. CRSAM framework 200 enables an entity owner or developer to gauge the likely impact, quantifying the likely impact relative to the current version of the hypothetical banking application. By quantifying the likely impact, the developer is afforded an opportunity assess whether the probable optimal action is to continue with implementation of the proposed modifications, revised the prosed modification, or develop a wholly new alternative application.

Moreover, CRSAM framework 200 is able to discover at the design stage or even during coding modifications likely to dissatisfy, confuse, or frustrate users. By identifying affected functionalities and quantifying the effect of the changes owing to contemplated modifications, CRSAM is able discover in advance modifications leading to a deterioration in the amelioration score and thus indicative of a likely derogation of user satisfaction with the computer software application if modified as contemplated.

The terminology used herein is for the purpose of describing particular embodiments only and is not intended to be limiting. Notwithstanding, several definitions that apply throughout this document will now be presented.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the term "user" refers to a human being.

The terms "first," "second," etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    retrieving, from a data storage device, an amelioration score for a computer software application, wherein the amelioration score is based on a predetermined set of operational attributes associated with a plurality of functionalities of the computer software application;
    performing, by a processor, a static analysis of a code of the computer software application based on a modification of the computer software application, wherein the static analysis of the code involves:
        determining one or more code modules, that are affected by the modification, based on changes to operational parameters of the one or more code modules, wherein the changes to the operational parameters include increase in processing time or additional delays;
    identifying, by the processor, one or more functionalities of the plurality of functionalities affected by the modification of the computer software application, wherein
        the identifying is based on the determining of the affected one or more code modules, and
        the one or more functionalities correspond to the affected one or more code modules;
    determining, by the processor, changes to the predetermined set of operational attributes associated with the identified one or more functionalities, wherein the operational attributes include at least a time for processing operations performed by the identified one or more functionalities;
    recomputing, by the processor, the amelioration score based on the determining of the changes to the predetermined set of the operational attributes, to generate a revised amelioration score;
    determining, by the processor, an impact of the modification of the computer software application based on a comparison of the amelioration score and the revised amelioration score;
    outputting, by the processor, a modification report based on the impact of the modification; and
    generating, by the processor, an alert indicating the impact of the modification on operability of the computer software application.

2. The computer-implemented method of claim 1,
wherein the modification of the computer software application is a multifaceted modification,
wherein the computer-implemented method further comprises:
   determining a set of functionalities of the plurality of functionalities affected by each implementation of a different facet of the multifaceted modification; and
   generating a facet-specific amelioration score for each functionality of the set of functionalities affected by each implementation of the different facet, and
wherein the outputting of the modification report is further based on the facet-specific amelioration score.

3. The computer-implemented method of claim 1,
wherein the modification of the computer software application is implementable using two or more alternate functionalities of the plurality of functionalities, and
wherein the computer-implemented method further comprises:
   generating a functionality-specific amelioration score for each functionality of the two or more alternate functionalities; and
   including, in the modification report, an indication of a functionality of the two or more alternate functionalities associated with a highest functionality-specific amelioration score.

4. The computer-implemented method of claim 1, further comprising:
   introducing a succession of modifications to the computer software application;
   generating a succession of revised amelioration scores for each modification of the succession of modifications; and
   generating a cumulative amelioration score based on accumulating of the revised amelioration scores generated for each modification of the succession of modifications for which a succeeding revised amelioration score differed from a preceding revised amelioration score by more than a threshold amount.

5. The computer-implemented method of claim 4, further comprising:
   indicating, in the modification report, replacement of the computer software application, based on the cumulative amelioration score falling below a predetermined threshold.

6. The computer-implemented method of claim 1, further comprising:
   receiving user feedback from a plurality of users of the computer software application as modified by the modification;
   generating an updated amelioration score for the computer software application as modified based, at least in part, on the user feedback; and
   rolling back the modification of the computer software application based on determining that a difference between the revised amelioration score and the updated amelioration score exceeds a predetermined threshold.

7. A system, comprising:
one or more processors configured to:
   retrieve an amelioration score for a computer software application, wherein the amelioration score is based on a predetermined set of operational attributes associated with a plurality of functionalities of the computer software application;
   perform a static analysis of a code of the computer software application based on a modification of the computer software application, wherein the static analysis of the code involves:
      determination of one or more code modules, that are affected by the modification, based on changes to operational parameters of the one or more code modules, wherein the changes to the operational parameters include increase in processing time or additional delays;
   identify one or more functionalities of the plurality of functionalities affected by the modification of the computer software application, wherein
      the identification is based on the determination of the affected one or more code modules, and
      the one or more functionalities correspond to the affected one or more code modules;
   determine changes to the predetermined set of operational attributes associated with the identified one or more functionalities, wherein the operational attributes include at least a time for processing operations performed by the identified one or more functionalities;
   recompute the amelioration score based on the determination of the changes to the predetermined set of the operational attributes, to generate a revised amelioration score;
   determine an impact of the modification of the computer software application based on a comparison of the amelioration score and the revised amelioration score;
   output a modification report based on the impact of the modification; and
   generate an alert indicating the impact of the modification on operability of the computer software application.

8. The system of claim 7,
wherein the modification of the computer software application is a multifaceted modification,
wherein the one or more processors are further configured to:
   determine a set of functionalities of the plurality of functionalities affected by each implementation of a different facet of the multifaceted modification; and
   generate a facet-specific amelioration score for each functionality of the set of functionalities affected by each implementation of the different facet, and
wherein the output of the modification report is further based on the facet-specific amelioration score.

9. The system of claim 7,
wherein the modification of the computer software application is implementable using two or more alternate functionalities of the plurality of functionalities, and
wherein the one or more processors are further configured to:
   generate a functionality-specific amelioration score for each functionality of the two or more alternate functionalities; and
   include, in the modification report, an indication of a functionality of the two or more alternate functionalities associated with a highest functionality-specific amelioration score.

10. The system of claim 7, wherein the one or more processors are further configured to generate the alert further based on a difference between the amelioration score and the revised amelioration score that is greater than a predetermined threshold.

11. The system of claim 7, wherein the one or more processors are further configured to:

introduce a succession of modifications to the computer software application;

generate a succession of revised amelioration scores for each modification of the succession of modifications; and generate a cumulative amelioration score based on accumulation of the revised amelioration scores generated for each modification of the succession of modifications for which a succeeding revised amelioration score differed from a preceding revised amelioration score by more than a threshold amount.

12. The system of claim 7, wherein the one or more processors are further configured to:

receive user feedback from a plurality of users of the computer software application as modified by the modification;

generate an updated amelioration score for the computer software application as modified based, at least in part, on the user feedback; and roll back the modification of the computer software application based on a determination that a difference between the revised amelioration score and the updated amelioration score exceeds a predetermined threshold.

13. A computer program product, the computer program product comprising:

one or more computer-readable storage media and program instructions collectively stored on the one or more computer-readable storage media, the program instructions when executed by a processor, cause the processor to initiate operations including:

retrieving an amelioration score for a computer software application, wherein the amelioration score is based on a predetermined set of operational attributes associated with a plurality of functionalities of the computer software application;

performing a static analysis of a code of the computer software application abased on a modification of the computer software application, wherein the static analysis of the code involves:

determining one or more code modules, that are affected by the modification, based on changes to operational parameters of the one or more code modules, wherein the changes to the operational parameters include increase in processing time or additional delays;

identifying one or more functionalities of the plurality of functionalities affected by the modification of the computer software application, wherein the identifying is based on the determining of the affected one or more code modules, and the one or more functionalities correspond to the affected one or more code modules;

determining changes to the predetermined set of operational attributes associated with the identified one or more functionalities, wherein the operational attributes include at least a time for processing operations performed by the identified one or more functionalities;

recomputing the amelioration score based on the determining of the changes to the predetermined set of the operational attributes, to generate a revised amelioration score;

determining an impact of the modification of the computer software application based on a comparison of the amelioration score and the revised amelioration score;

outputting a modification report based on the impact of the modification; and generating an alert indicating the impact of the modification on operability of the computer software application.

14. The computer program product of claim 13, wherein the modification of the computer software application is a multifaceted modification, wherein the program instructions further cause the processor to initiate the operations further including:

determining a set of functionalities of the plurality of functionalities affected by each implementation of a different facet of the multifaceted modification; and generating a facet-specific amelioration score for each functionality of the set of functionalities affected by each implementation of the different facet, and wherein the output of the modification report is further based on the facet-specific amelioration score.

15. The computer program product of claim 13, wherein the modification of the computer software application is implementable using two or more alternate functionalities of the plurality of functionalities, and wherein the program instructions further cause the processor to initiate the operations further including:

generating a functionality-specific amelioration score for each functionality of the two or more alternate functionalities; and including, in the modification report, an indication of a functionality of the two or more alternate functionalities associated with a highest functionality-specific amelioration score.

16. The computer program product of claim 13, wherein the program instructions further cause the processor to initiate the operations further including: generating the alert based on a difference between the amelioration score and the revised amelioration score that is greater than a predetermined threshold.

17. The computer program product of claim 13, wherein the program instructions further cause the processor to initiate the operations further including:

introducing a succession of modifications to the computer software application;

generating a succession of revised amelioration scores for each modification of the succession of modifications; and generating a cumulative amelioration score based on accumulating of the revised amelioration scores generated for each modification of the succession of modifications for which a succeeding revised amelioration score differed from a preceding revised amelioration score by more than a threshold amount.

18. The computer program product of claim 17, wherein the program instructions further cause the processor to initiate operations further including:

indicating, in the modification report, replacement of the computer software application, based on the cumulative amelioration score falling below a predetermined threshold.

19. The computer program product of claim 13, wherein the program instructions further cause the processor to initiate operations further including:

receiving user feedback from a plurality of users of the computer software application as modified by the modification;

generating an updated amelioration score for the computer software application as modified based, at least in part, on the user feedback; and rolling back the modification of the computer software application based on determining that a difference between the revised amelioration score and the updated amelioration score exceeds a predetermined threshold.

* * * * *